US007760057B2

(12) United States Patent
Leipold et al.

(10) Patent No.: US 7,760,057 B2
(45) Date of Patent: Jul. 20, 2010

(54) ELECTRICAL SWITCHING DEVICE COMPRISING MAGNETIC ADJUSTING ELEMENTS

(75) Inventors: Markus Leipold, Isen (DE); Helmut Hingrainer, Raubling (DE); Alexander Bayer, Munich (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 0 days.

(21) Appl. No.: 11/666,698

(22) PCT Filed: Oct. 21, 2005

(86) PCT No.: PCT/EP2005/011350

§ 371 (c)(1),
(2), (4) Date: Aug. 7, 2007

(87) PCT Pub. No.: WO2006/048137

PCT Pub. Date: May 11, 2006

(65) Prior Publication Data

US 2007/0290777 A1 Dec. 20, 2007

(30) Foreign Application Priority Data

Oct. 29, 2004 (DE) ........................ 10 2004 052 591
Jun. 2, 2005 (DE) ........................ 10 2005 025 403

(51) Int. Cl.

| | |
|---|---|
| ***H01H 1/66*** | (2006.01) |
| ***H01H 51/00*** | (2006.01) |
| ***H01H 51/22*** | (2006.01) |
| ***H01H 9/00*** | (2006.01) |
| ***G02B 6/26*** | (2006.01) |
| ***G02B 6/42*** | (2006.01) |

(52) U.S. Cl. ......................... 335/151; 335/78; 335/205; 385/20

(58) Field of Classification Search ................. 335/179, 335/4–5, 78, 104–105, 79, 151–153, 205–207; 200/181, 1 R; 333/101, 105, 22 R; 385/20, 385/22
See application file for complete search history.

(56) References Cited

U.S. PATENT DOCUMENTS 2,907,846 A * 10/1959 Wilhelm ...................... 335/81

(Continued)

FOREIGN PATENT DOCUMENTS

| | | |
|---|---|---|
| DE | 1990414 | 8/1968 |
| DE | 2052187 | 4/1972 |

(Continued)

*Primary Examiner*—Lincoln Donovan
*Assistant Examiner*—Alexander Talpalatskiy
(74) *Attorney, Agent, or Firm*—Marshall, Gerstein & Borun LLP

(57) ABSTRACT

An electrical switching device, especially a high-frequency switching device, comprising an elongate electrical switching element, a contact end of which is disposed between two opposite contact elements that are transversally spaced apart from each other. The switching element can be selectively moved perpendicularly to the longitudinal direction thereof towards one or the other opposite contact element by two adjusting elements that are located on both sides next to the switching element. In order to eliminate or at least reduce frictional processes and the risk of the electrical contact being damaged by abrasion, the switching element is made at least in part of magnetic material while the adjusting elements are formed by two magnet assemblies, the magnetic force of one magnet assembly or the other magnet assembly being selectively reducible or increasable.

17 Claims, 5 Drawing Sheets

U.S. PATENT DOCUMENTS

| | | | | | |
|---|---|---|---|---|---|
| 3,040,146 | A | | 6/1962 | Immel et al. | |
| 3,295,023 | A | * | 12/1966 | Peras | 361/114 |
| 3,356,909 | A | * | 12/1967 | Polasek | 361/186 |
| 3,525,958 | A | * | 8/1970 | Rauterberg | 335/153 |
| 3,597,712 | A | * | 8/1971 | Nakagome et al. | 335/71 |
| 3,763,449 | A | * | 10/1973 | Kimball | 335/151 |
| 3,914,723 | A | * | 10/1975 | Goodbar | 335/79 |
| 4,065,677 | A | * | 12/1977 | Micheron et al. | 307/112 |
| 4,150,348 | A | * | 4/1979 | Foltz | 335/4 |
| 4,205,242 | A | * | 5/1980 | Micheron et al. | 307/400 |
| 4,467,304 | A | * | 8/1984 | Reisem | 335/227 |
| 5,070,317 | A | * | 12/1991 | Bhagat | 336/200 |
| 5,818,316 | A | * | 10/1998 | Shen et al. | 335/78 |
| 5,847,631 | A | * | 12/1998 | Taylor et al. | 335/78 |
| 5,864,643 | A | * | 1/1999 | Pan | 385/22 |
| 5,909,163 | A | * | 6/1999 | Posey | 335/151 |
| 6,178,142 | B1 | * | 1/2001 | Fujita | 369/13.15 |
| 6,429,758 | B1 | * | 8/2002 | Emelo et al. | 335/4 |
| 6,593,834 | B2 | * | 7/2003 | Qiu et al. | 333/262 |
| 6,633,212 | B1 | * | 10/2003 | Ruan et al. | 335/78 |
| 6,654,185 | B1 | * | 11/2003 | Liu et al. | 359/814 |
| 6,842,558 | B2 | * | 1/2005 | Mitsuoka et al. | 385/23 |
| 6,891,454 | B1 | * | 5/2005 | Naito et al. | 335/78 |

FOREIGN PATENT DOCUMENTS

| | | | | |
|---|---|---|---|---|
| DE | 4226106 | | | 9/1993 |
| DE | 10103814 | | | 8/2002 |
| GB | 1021047 | | | 2/1966 |
| JP | 59025401 | A | * | 2/1984 |
| JP | 59086305 | | | 5/1984 |
| JP | 59086305 | A | * | 5/1984 |
| JP | 2003066350 | A | * | 3/2003 |
| WO | WO 94/03914 | | | 2/1994 |

OTHER PUBLICATIONS

International Search Report Completed Feb. 7, 2006, Mailed Feb. 23, 2006; based on corresponding PCT/EP2005/011350; Filed Oct. 21, 2005 (English and German versions).

International Preliminary Examination Report based on corresponding PCT/EP2005/011350; Filed Oct. 21, 2005 (German report with English translation of annex thereto).

* cited by examiner

ELECTRICAL SWITCHING DEVICE COMPRISING MAGNETIC ADJUSTING ELEMENTS

BACKGROUND OF THE INVENTION

1. Field of the Invention

The invention relates to an electrical switch device and, in particular, to a high frequency switch device.

2. Related Technology

A switch device of this type is described in DE 101 03 814 A1. The switch device serves in particular for switching off a current line for a high frequency reference line via various damping elements. For this purpose, it has an oblong switch element which is movable transversely relative to its longitudinal direction by means of a displacement element and, with a contact surface at its one end, is thereby optionally brought out of contact or in contact with a counter-contact surface. In the contact position, the line of the electrical current to the contact surfaces is dependent inter alia upon the mutual abutment of the contact surface and counter-contact surface. Contaminants or particles can substantially damage the current line, in particular when the contaminants or particles comprise electrically non-conducting material.

An interference-free current line is particularly important with reference lines which serve for damping adjustment, e.g. of signal generators or network analysers. Reference lines have for example a plurality of serially arranged, four-pole switch devices with, on the input and output side, the same and constant characteristic wave impedance and also respectively adjustable calibrated damping.

In the case of known electrical high frequency switch devices, as are used for example typically in high frequency reference lines, the lateral switch movement of a switch element is achieved by means of an external mechanical force effect by means of tappets which strike laterally against the switch element and thereby move it. On the basis of the lateral pivot movement which the switch element performs and the linear thrust movements of the tappets which are present on both sides of the switch element, sliding movements which lead to abrasion material on the basis of the resulting friction are produced in the contact region of the tappets and the switch element. In particular when the switch device has a closed switching space, the danger of contact interference due to abrasion material produced by the friction is particularly high because the abrasion material remains in the switching space. However even in the case of an open switching space, the danger exists that the abrasion material enters between the contact surfaces and impairs the electrical contact.

GENERAL DESCRIPTION OF THE INVENTION

The invention eliminates or at least reduces friction processes in the case of an electrical switch device of the type described above and the danger resulting therefrom of damage to the electrical contact due to abrasion material. In particular, the occurrence of abrasion material in the surroundings of the contact surfaces is avoided or at least reduced. In addition, a simple and also compact construction is produced, which can be integrated well and also in a simple and economical manner not only in the switch device but also in or on a protective housing which receives the switch device.

Accordingly, the invention provides an electrical switch device having an oblong electrical switch element disposed with a contact end thereof between two counter-contact elements which have a transverse spacing relative to each other and is movable, by two displacement elements which are disposed on both sides next to the switch element, transversely relative to a longitudinal direction of the switch element, optionally towards the one or the other counter-contact element, the switch element comprising magnetic material and the displacement elements being formed by two magnet arrangements, the magnetic force of the one magnet arrangement and/or the magnetic force of the other magnet arrangement being respectively optionally reducible or increasible, and, with respect to a transverse plane which intersects the magnet arrangements, two switch elements situated opposite each other and being movable with contact ends which are oriented towards each other respectively by means of a common magnet arrangement transversely towards counter-contact elements which are disposed on both sides.

The knowledge underlying the invention is that, in the case of a switch movement drive of the switch element with magnetic forces, there is no requirement for a mechanical movement contact between the switch element and the displacement elements and therefore, in the case of switch movements of the switch element which are produced with magnetic forces, in this respect no sliding friction takes place nor is abrasion material resulting therefrom produced.

In the case of one embodiment of the switch device according to the invention, the switch element comprises at least partially magnetic material and the displacement elements are formed by two magnet arrangements, of which the magnetic force of the one magnet arrangement or also the magnetic force of the other magnet arrangement is or are respectively optionally reducible or increasable. As a result, the switch device can be switched by reducing or increasing the magnetic force such that the laterally movable switch element is moved either towards the counter-contact element which is disposed on the one side and is retained thereon or is moved towards the counter-contact element disposed on the other side and is retained. This movement drive is effected without contact and without friction so that abrasion material, as occurs in the state of the art, is avoided and therefore any impairment resulting therefrom to the electrical contact is avoided and a good electrical contact is ensured. The invention therefore provides a simple and compact construction which can be produced also economically and can be readily integrated not only in the switch device itself but also in a protective housing which surrounds the switch device.

In the case of an embodiment of the invention, a magnetic force difference between the magnet arrangements is produced by reducing or increasing the magnetic force of a lateral magnet arrangement or both magnet arrangements, said difference being so large that respectively the magnet arrangement with the greater magnetic force is able to draw the switch element towards itself and towards the counter-contact element situated on the same side and to retain it thereon. Release from the counter-contact element can then be effected in that the magnetic force of the magnet arrangement which retains the switch element on the adjacent counter-contact element is reduced so far that the magnetic force of the oppositely situated magnet arrangement predominates and releases the switch element and draws it towards this magnet arrangement and makes contact with the counter-contact element situated on this side, or the magnetic force of this oppositely situated magnet arrangement is increased so far that this magnetic force releases the switch element and moves it to this side and makes contact with the counter-contact element situated on this side.

Within the scope of an embodiment of the invention, it is thereby unnecessary that magnet arrangements with reducible or increasable magnetic forces need be present on both sides. Within the scope of the invention, it suffices if a magnet arrangement is present on one side, the magnetic force of which is reducible or increasable in order to release the switch element from the oppositely situated counter-contact element and to draw it towards the counter-contact element which is disposed on its side or vice versa.

In one embodiment, reducing or increasing the magnetic force can be achieved in that an electromagnet is provided, which can optionally be switched on and switched off or the magnetic force of which is reducible or again increasable. The sought magnetic force change can however also be achieved in that an electromagnet and a permanent magnet are combined in an essentially coaxial arrangement, the permanent magnet being able to form an extension of the core of the electromagnet or being able to form the core of the electromagnet. This embodiment leads not only to a compact construction but also makes it possible to superimpose the magnetic force of the permanent magnet in the sense of an addition or subtraction of the magnetic forces due to a homopolar or antipolar arrangement of the electromagnet and of the permanent magnet. It is thereby particularly advantageous to configure the electromagnet to be pole-changing so that the magnetic force change can be altered by addition and subtraction of the magnetic forces. If the electromagnet is in addition also still configured able to be switched off, a threefold change in the respective magnetic force can be achieved.

It is furthermore advantageous to provide respectively one permanent magnet with a magnetic force which is so great that the electromagnet can be switched off directly after contact of the switch element with the associated counter-contact element and the switch element is retained on the counter-contact element by the magnetic force of the permanent magnet.

A particularly advantageous development of the invention resides an embodiment wherein, with respect to a transverse plane of the switch device which intersects the magnet arrangements preferably centrally, two switch elements are disposed situated one opposite the other and are movable with their contact ends which are orientated towards each other transversely towards counter-contact elements which are disposed on both sides. This embodiment makes it possible to actuate both oppositely situated switch elements respectively with one magnet arrangement. As a result, a four-pole switch arrangement which is suitable in particular for a reference line can be achieved in a simple manner.

Within the scope of one embodiment of the invention, a switch element which can be moved in any way to one and the other side is basically suitable. Particularly advantageously, a switch element which is formed by a spring tongue is suitable, said switch element being able to be bent laterally in opposition to its elastic restoring forces based on intrinsic elasticity and returning in the inoperative state automatically into a central position from which it can be switched optionally to the one or other side.

In construction cases in which the switch device according to the invention is disposed in a protective housing, the electromagnet is preferably be attached or incorporated in a lateral arrangement on the protective housing or by integration into the base region of the protective housing whilst ensuring a simple and compact construction.

Further development features of the invention lead to simple and compact constructions which can be produced economically and also enable reliable functioning and contacting.

BRIEF DESCRIPTION OF THE DRAWINGS

Advantageous embodiments of the invention are subsequently explained in more detail with reference to several embodiments and drawings. There are shown.

DETAILED DESCRIPTION

Figure 1:
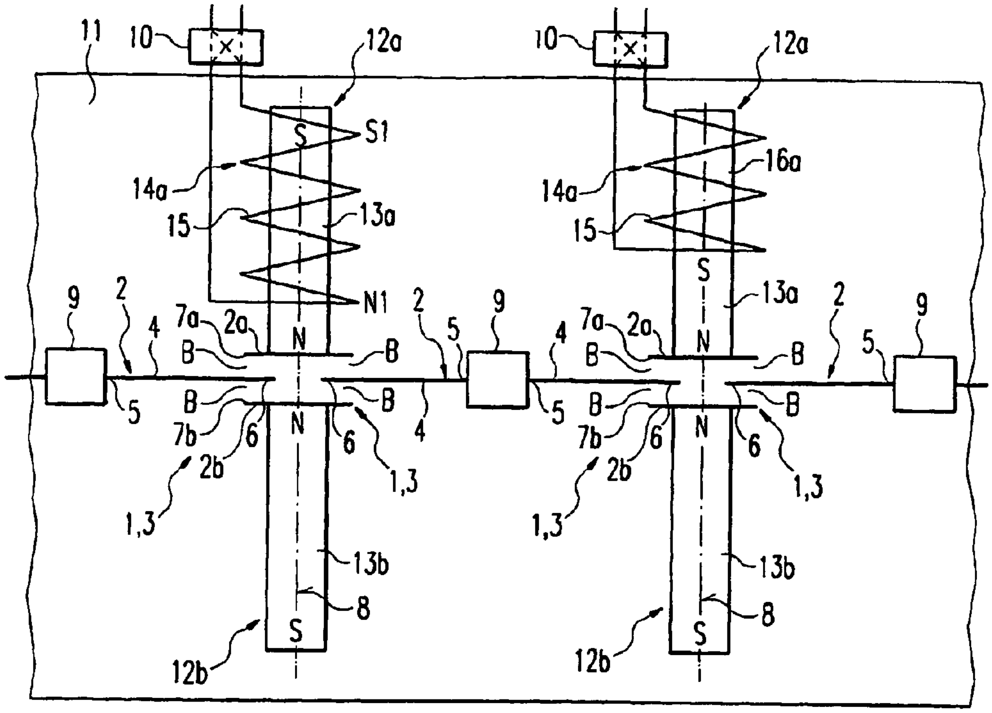
FIG. 1 shows two electrical switch device pairs according to the invention in a schematic representation, the right half of the figure with the right switch device pair showing a modified embodiment.

The four switch devices of the two switch device pairs, which are designated in their entirety with reference numeral 1, have respectively an electrical line 2 to a switch 3 and to a switch element 4 which is movable to and fro transversely relative to the electrical line 2 and serves to open or to close the line 2. The switch element 4 is an oblong element which is connected permanently at a base end 5 to the line 2 and, at its other end, has a contact end 6 with which it abuts, after a transverse movement, in its contact position on one of two counter-contact elements 7*a*, 7*b* which are disposed transversely at a spacing from each other. An open position can be produced in the illustrated central position in which the contact end 6 has a lateral spacing from the counter-contact elements 7*a*, 7*b*.

In the embodiment, the switch device 1 is part of a so-called reference line with switchable reference line portions 2*a*, 2*b* which are disposed in parallel and can be switched optionally by the switch element 4, at least one reference line portion being damped and forming a damped line. In FIG. 1, two switch device pairs with respectively two switches 3 which are disposed in mirror image relative to each other are represented, one switch device pair respectively of which forms a four-pole reference line longitudinal portion. This is configured with two reference line portions 2*a*, 2*b* and two switch elements 4 which are preferably identical to each other and are disposed in mirror image relative to each other on both sides of a transverse plane 8 which extends transversely to the electrical line 2 and approximately centrally between the counter-contact elements 7*a*, 7*b* so that the contact ends 6 thereof are directed towards each other, are disposed respectively between two laterally spaced counter-contact elements 7*a*, 7*b* and are movable optionally towards the one or the other counter-contact element 7*a*, 7*b*. Since the switches 3, which are disposed in mirror image on both sides of the transverse plane 8, of the embodiment on the left in FIG. 1 are essentially the same, only the switch device 1 which is disposed on the left of the transverse plane 8 with its switch 3 is described below.

The switch element 4 is preferably laterally elastically flexible, its base end 5 being retained on a holder 9 which is mounted on a base 11. A spring tongue in the form of a flat strip is particularly suitable as flexible switch element, said spring tongue being illustrated in FIGS. 1 and 2 in side view so that its narrow side is visible and its two oppositely situated broad sides are orientated towards the counter-contact element 7*a*, 7*b*. The flat strip can also be formed by a thin film, the thickness of which is less than 1/10 mm and for example is only a few μm.

In order to implement a switching procedure, in which the switch element 4 is moved laterally towards the one or the other counter-contact element 7*a*, 7*b*, a magnet arrangement 12*a*, 12*b* for lateral movement of the contact end 6 in the direction of and towards the one or the other counter-contact element 7*a*, 7*b* is provided on each side of the switch element 4.

In the embodiment according to FIG. 1, on the left, the magnet arrangement 12*a* is formed by an electromagnet, the magnetic force of which is optionally increasable and reducible, or by a permanent magnet 13*a* and an electromagnet 14*a* with a coil 15, the permanent magnet 13*a* and the electromagnet 14*a* being preferably integrated coaxially one in the other and the bar-shaped permanent magnet 13*a* forming the core of the electromagnet 14*a*.

In the embodiment according to FIG. 1, the magnet arrangement 12*b* is formed respectively only by one permanent magnet 13*b*. The magnet arrangements 12, 12*b* with all three magnets 13*a*, 13*b*, 14*a* are disposed outwith the lateral movement region B of the switch element 4 and are directed towards the associated broad side of the switch element 4 in their operative directions so that they do not impede the movement thereof and thereby have a magnetic effect on the switch element 4 made of magnetic material.

The permanent magnets 13*a*, 13*b* can be disposed in a homopolar or non-homopolar manner. In the present embodiment, the permanent magnets 13*a*, 13*b* are orientated towards each other and towards the switch element 4 with their north poles N.

The permanent magnets 13*a*, 13*b* are thereby disposed on the sides of the reference line portions 2*a*, 2*b* which are orientated away from the switch element 4, a fixed connection being able to be present respectively therebetween, e.g. by gluing or soldering.

The magnetic force produced by the electromagnet 14*a* is superimposed on the magnetic force of the permanent magnet 13*a* as a function of the polarity. If the permanent magnet 13*a* and the electromagnet 14*a* have a homopolar configuration, the magnetic forces thereof are added so that the magnetic force of the permanent magnet 13*a* or of the magnet arrangement 12*a* is a low value when the electromagnet 14*a* is switched off. In the switched-on state, the magnetic forces are added to form a high value.

If the electromagnet 14*a* and the permanent magnet 13*a* are disposed in a non-homopolar manner, the magnetic forces are subtracted, in the switched-on state, to form a low value which can go as far as zero for example. In the switched-off state of the electromagnet 12*a*, the magnetic force of the permanent magnet 13*a* is a low value.

The magnetic forces are thereby designed such that the magnetic force of the permanent magnet 13*b* and the high value of the magnetic force of the magnet arrangement 12*a* are respectively able to draw the switch element 4 towards them and to bring and retain it in contact with the associated counter-contact element 7*a*, 7*b*. This applies to the high value of the magnetic force of the magnet arrangement 12*a* even when the effectiveness of the magnetic force of the permanent magnet 13 is available and to the magnetic force of the permanent magnet 13*b* and also when the effectiveness of the low value of the magnet arrangement 12*a* is available which can go as far as zero according to the design. Switching from the switching effectiveness of the magnet arrangement 12 to the switching effectiveness of the permanent magnet 13*b* or vice versa can be effected respectively by a current impulse which effects the pole switch of the electromagnet 12*a*.

If the poles N1, S1 of the electromagnet 14*a* are intended to be switchable, a pole switching mechanism 10 which is illustrated in a simplified manner is provided.

The embodiment on the right according to FIG. 1, in which the same or comparable parts are provided with the same reference numbers, differs from the embodiment on the left according to FIG. 1 in that the permanent magnet 13*a* and a core 16*a* of the electromagnet 12*a* and also a core 16*b* of the electromagnet 12*b* are disposed essentially coaxially one behind the other, the permanent magnet 13*a* or 13*b* being disposed between the reference line portion 2*a* or 2*b* and the core 16*a* or 16*b*. The core 16*a* or 16*b* and the permanent magnet 13*a* or 13*b* can be connected securely to each other at their sides which are orientated towards each other, e.g. by gluing or soldering.

In addition, the configuration and function of the embodiment according to FIG. 1, on the right, essentially corresponds to the embodiment according to FIG. 1, on the left, so that, for reasons of simplification, further descriptions of the embodiment according to FIG. 1, on the right, can be dispensed with.

Figure 2:
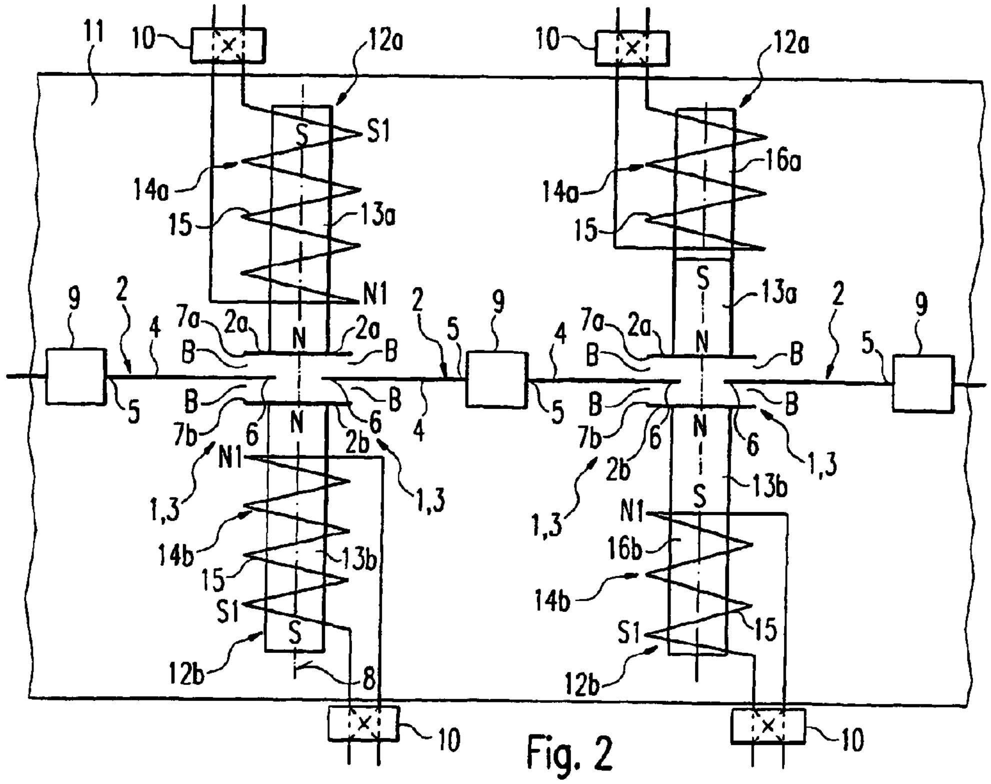
FIG. 2 shows two electrical switch device pairs according to the invention in a schematic representation in further modified embodiments.

The embodiments according to FIG. 2 on the left and FIG. 2 on the right differ from the previously described embodiments merely in that an electromagnet 14*b* is likewise assigned to the permanent magnet 13*b* which form the magnet arrangement 12*b*. The magnet arrangements 12*a*, 12*b* are preferably identical and are disposed or also configured in mirror image with respect to the line 2 such and it operates preferably also correspondingly in mirror image.

In the embodiments according to FIG. 2, by switching on the high value of the magnetic force of the one magnet arrangement and the low value of the magnetic force of the other magnet arrangement, the magnetic force difference can be increased, essentially doubled, which contributes to functional reliability of the switch device 1 because the switch device 1 can be operated with effective magnetic forces which substantially exceed/fall below the movement resistance of the switch element 4 and the low value of the respectively oppositely situated magnetic force.

It is furthermore advantageous to provide respectively one permanent magnet 12*a* or 12*b* with a magnetic force which is so great that the electromagnet 14*a* or 14*b* can be switched off directly after contact of the switch element 4 with the associated counter-contact element 7*a* or 7*b* and the switch element 4 is retained on the counter-contact element 7*a* or 7*b* by the magnetic force of the permanent magnet 13*a* or 13*b*.

The permanent magnets 13*a* and 13*b* which are situated opposite each other with respect to the line 2 can be respectively identical on the left and on the right in the embodiment according to FIG. 1.

In all the embodiments, the switch element 4 is hence displaced magnetically into the respective contact position and retained in this position. Hence mechanically acting displacement elements which could produce abrasion material on the basis of pressure and frictional contact are dispensed with, which abrasion material could enter between the electrical contact surfaces and could damage the electrical contact.

In order to protect the electrical contact surfaces which cooperate with each other from contamination from outside, it is advantageous to dispose the switch device 1, at least with respect to the parts which have contact surfaces, in the protective space 21 of a preferably sealed housing 22.

The embodiments according to FIG. 3 to 6, in which identical or comparable parts are likewise provided with the same reference numbers, show such a housing 22 in perspective illustration from above, the protective space 21 being able to be opened and closed optionally from the top by a cover 22*a*.

In these constructions, the base 11 is formed by a housing base 22*b* and two oppositely situated lateral walls 22*c*, the cover 22*a* which can be placed thereon and two oppositely situated end walls 22*d* which are placed at the end side against the housing base 22*b* and the lateral walls 22*c* and are screwed thereon. Preferably, the end walls 22*d* project beyond the lateral walls 22*c* so that they receive also the cover 22*a* between themselves and can likewise be screwed thereon. In order to improve the seal of the internally flat adjacent end walls 22*d*, they are respectively sealed by a sealing ring 23 comprising elastically compressible material, such as rubber or plastic material, which preferably sits in an annular groove 24 in the abutment surface of the end walls 22*d* and projects slightly beyond the abutment surface.

In the central region of the end walls 22*d*, respectively one lead-through 25 for the electrical line 2 is disposed with respectively one bush-like cable screw connection 26 which protrudes outwards, and through which the electrical line 2 extends into the protective space 21 and is sealed, e.g. screwed in.

In the protective space 21 there are preferably located the holders 9 for the switch elements 4 in the end regions of said protective space. The holders 9 can be formed respectively by a clamping device with clamping jaws between which the associated switch element 4 can be clamped.

In addition, the embodiments according to FIGS. 3 to 6 have the following particular features. In the construction according to FIG. 3 which corresponds to the embodiment on the left or on the right according to FIG. 1, the electromagnet 14*a* with its coil 15 is attached laterally to the housing 22. A housing 31 can serve for this purpose, in which the electromagnet 14*a* is disposed and is mounted with the latter on the associated side of the housing 22, e.g. by a screw connection. The housing 31 is preferably open on the underside and upper side, as a result of which not only is material and weight saved but also an independently effective air cooling is achieved which operates according to the principle of natural convection. Such a housing 31 can have a lateral extension wall 31*a*, two lateral walls 31*b* and a rear wall 31*c* between which the electromagnet 14*a* is disposed and fixed, for instance coaxially relative to the permanent magnet 13*a*.

Figure 3:
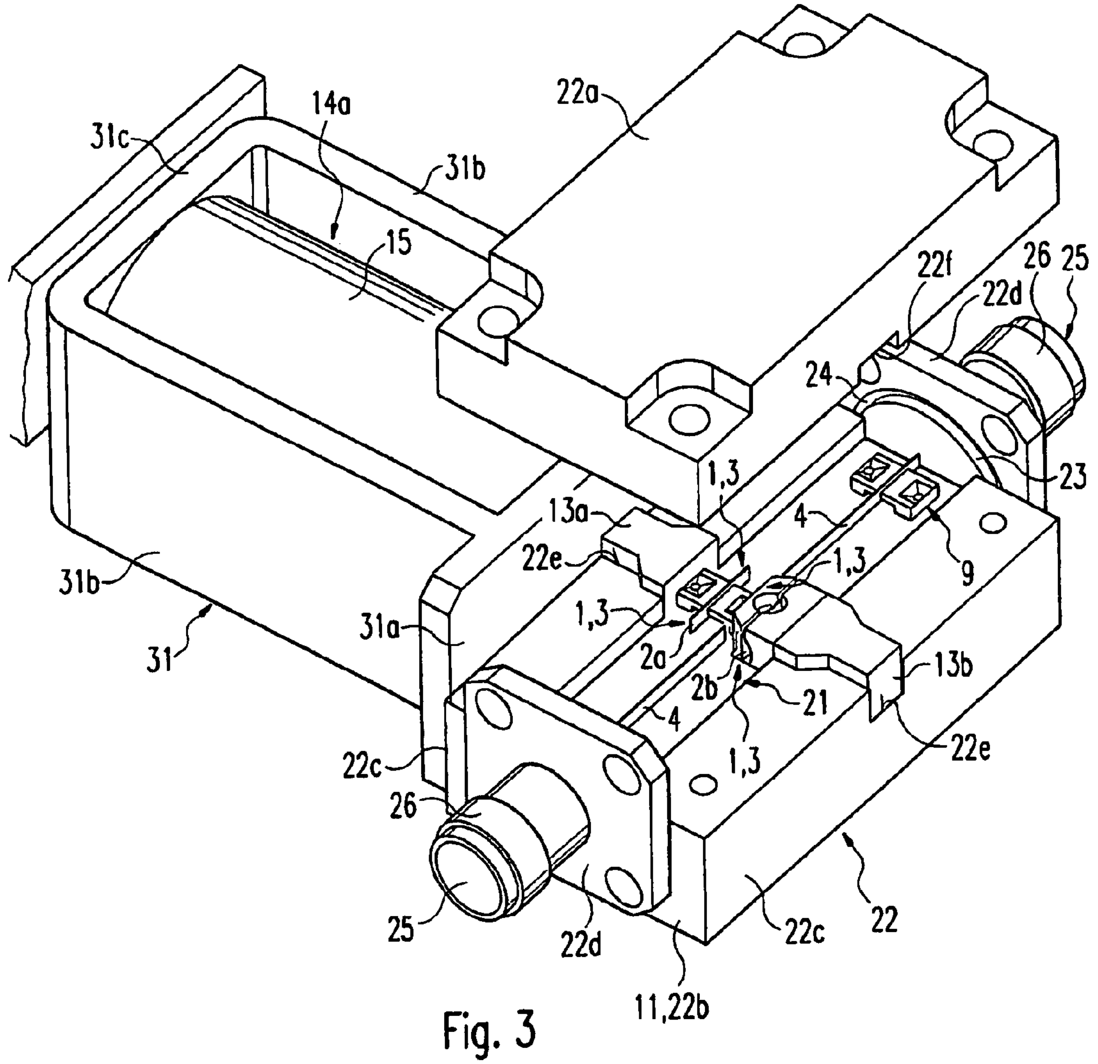
FIG. 3 shows a housing with a switch device pair according to the invention in a further modified embodiment.

The permanent magnets 13*a*, 13*b* are preferably disposed countersunk in upper-side transverse grooves 22*e*, the depth of the transverse grooves 22*e* being smaller than the height of the permanent magnets 13*a*, 13*b* so that the latter can project from the housing 22 at the top. In this case, transverse grooves 22*f* which fit in the underside of the cover 23 are disposed, into which transverse grooves the protruding portions of the permanent magnets 13*a*, 13*b* project. The length of the permanent magnets can thereby be adapted to the width of the housing 22 such that their laterally outer ends terminate substantially with the outsides of the housing 22, as is represented in FIG. 3.

Figure 4:
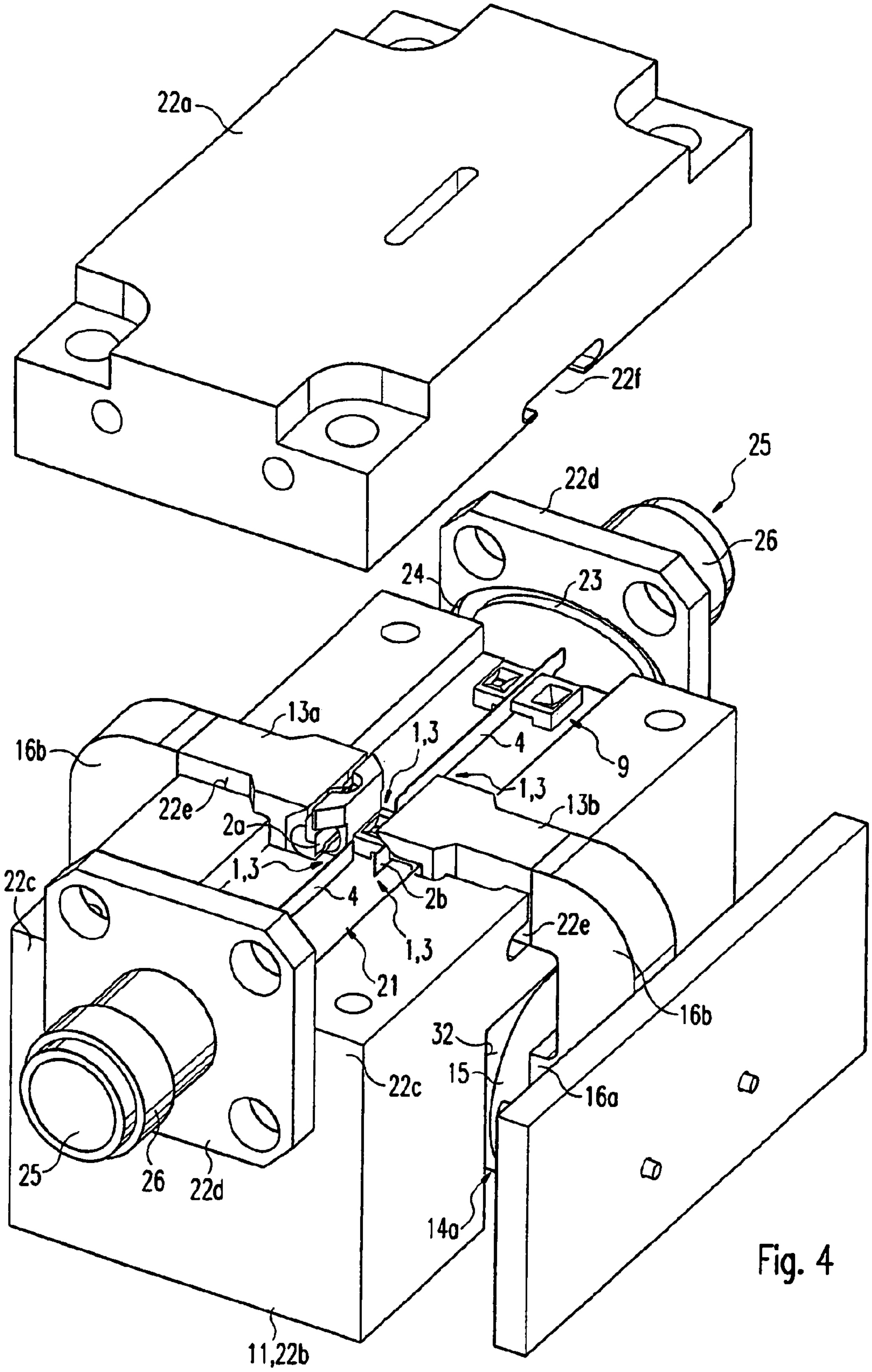
FIG. 4 shows a housing with a switch device pair according to the invention in a further modified embodiment.

In the embodiment according to FIG. 4, the electromagnet 14*a* is integrated with its coil 15 into the housing 22, said electromagnet being located under the switch device 1 and being disposed and fixed for example in a housing recess 32 which is open for example to the bottom and to the side.

In this embodiment, lateral and e.g. U-shaped core parts 16*b* are provided, which connect the cores of the permanent magnets 13*a*, 13*b* to the core of the electromagnet 14*a* which is designated with 16*a* or 16*b* in order to form an annularly closed common core up to the region of the switch device 1.

Figure 5:
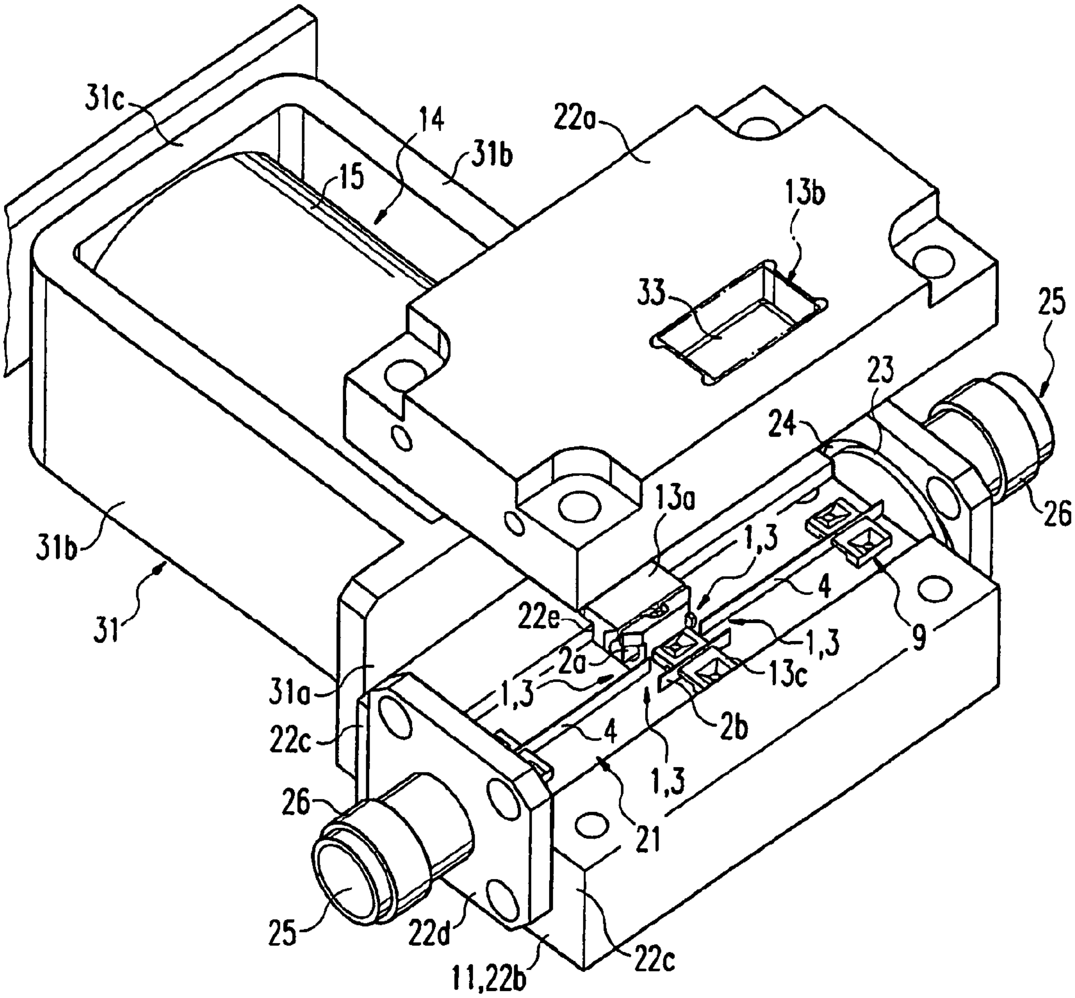
FIG. 5 shows a housing with a switch device pair according to the invention in a further modified embodiment.

Within the scope of the invention, at least one of the permanent magnets 13*a*, 13*b* can be disposed not in the housing 22 but in the cover 22*a*. FIG. 5 shows such an embodiment in which an e.g. vertically continuous recess 33 which is open at least on the underside for the permanent magnet 13*b* situated on this side is disposed in the cover 22*a* and is represented in the recess 33 by indication only.

Figure 6:
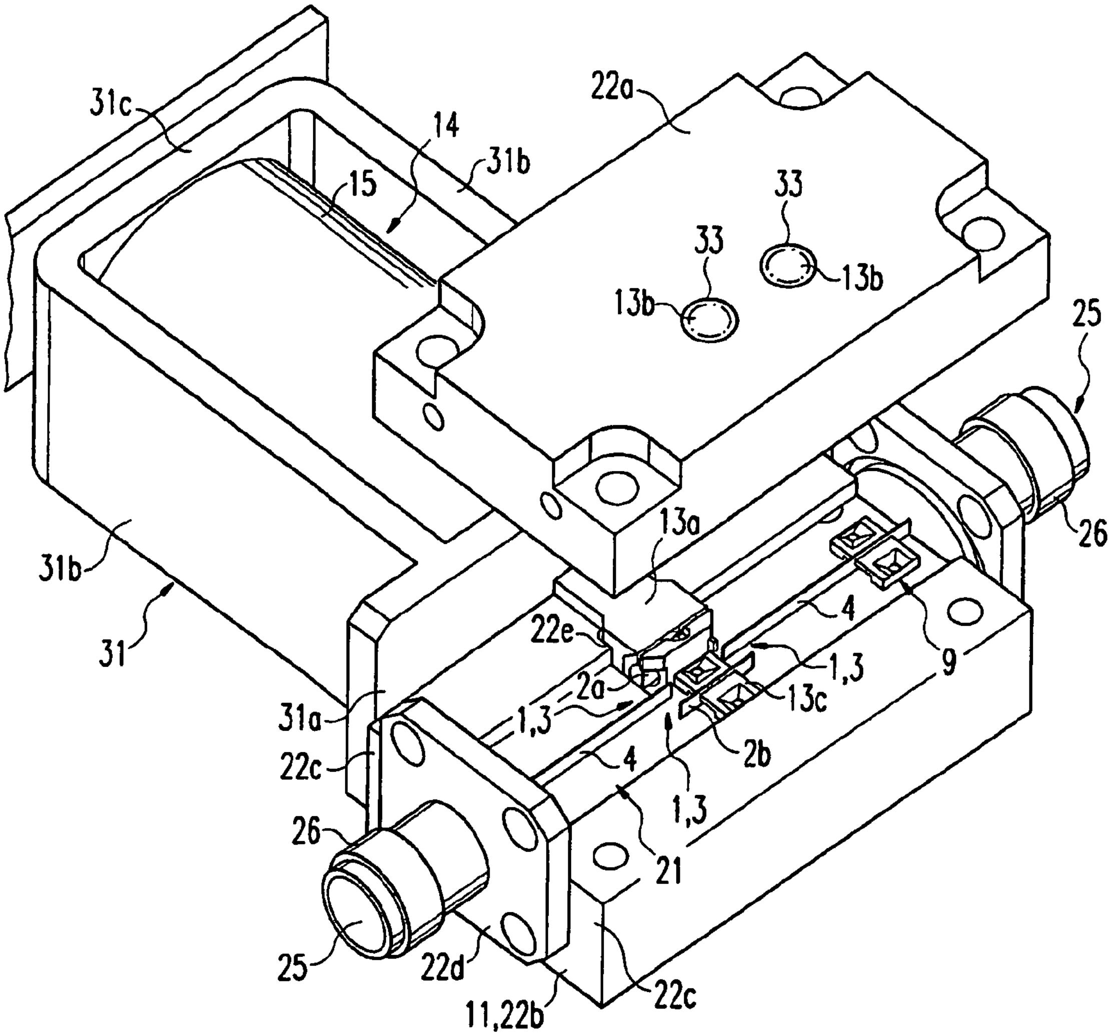
FIG. 6 shows housing with a switch device according to the invention in a further modified embodiment.

Instead of a permanent magnet in the cover 22*a*, also a plurality of permanent magnets can be disposed therein, as FIG. 6 shows by way of example, in which two permanent magnets 13*b* are disposed next to the associated switch device 1, 3 in the cover 22*a* in associated recesses 33 and are positioned therein. In the embodiments according to FIGS. 5 and 6, the line portions 2*b* are disposed on permanent magnet parts 13*c* which are in magnetic operational connection with the permanent magnets 13*b*.

Within the scope of the invention, a plurality of switch devices 1 can be disposed in the protective space 21 of the housing 22 in the longitudinal direction of the line 2, situated one behind the other.

The invention claimed is:

1. Electrical switch device having an oblong electrical switch element disposed with a contact end thereof between two transversely-spaced, counter-contact elements that mate with said contact end, which contact end is movable transversely with respect to a longitudinal direction of the switch element toward either of the counter-contact elements by two displacement elements disposed on both sides of and next to the switch element, the switch element comprising magnetic material and the displacement elements comprising two magnet arrangements, said magnet arrangements defining respective magnetic pole axes, wherein each magnetic pole axis extends through the north and south poles of the respective magnet arrangement, and the magnetic field strength of one magnet arrangement and/or the magnetic field strength of the other magnet arrangement being respectively optionally reducible or increasable and wherein the magnetic pole axes of the magnet arrangements are directed transversely with respect to the longitudinal direction of the switch elements, wherein the magnet arrangement with the optionally reducible or increasable magnetic field strength comprises a permanent magnet and an electromagnet, wherein the other magnet arrangement comprises a permanent magnet, and wherein the permanent magnets are disposed in a homopolar manner such that the permanent magnets are oriented towards each other and towards the switch element with the same pole.

2. Switch device according to claim 1, wherein the reducible magnetic field strength of one respective magnet arrangement is reducible sufficiently that the magnetic field strength of the opposed magnet arrangement suffices to move the switch element toward the associated counter-contact element and to retain it thereon.

3. Switch device according to claim 2, wherein the difference between the reduced magnetic field strength of one respective magnet arrangement and the reduced magnetic field strength or the increased magnetic field strength of the opposed magnet arrangement sufficiently to move the switch element toward the associated counter-contact element and to retain it thereon.

4. Switch device according to claim 1, wherein the increasible magnetic field strength of one respective magnet arrangement is increasable sufficiently to move the switch element toward the associated counter-contact element and to retain it thereon.

5. Switch device according to claim 4, wherein a difference between the increased magnetic field strength of the respective magnet arrangement and the reduced magnetic field strength or the increased magnetic field strength of the opposed magnet arrangement suffices to move the switch element toward the associated counter-contact element and to retain it thereon.

6. Switch device according to claim 1, wherein the magnetic field strength of one magnet arrangement is reducible sufficiently that the magnetic field strength of the other magnet arrangement moves the switch element toward the counter-contact element associated with the other magnet arrangement and to retain it thereon.

7. Switch device according to claim 1, wherein the magnetic field strength of one magnet arrangement is increasable sufficiently to move the switch element toward the counter-contact element which is disposed on its side and to retain it thereon.

8. Switch device according to claim 1, wherein a magnet arrangement comprising electromagnets or a permanent magnet and an electromagnet is disposed on both sides of the switch element.

9. Switch device according to claim 1, wherein a permanent magnet and an electromagnet are disposed coaxially relative to each other.

10. Switch device according to claim 9, wherein the permanent magnet or an extension of the permanent magnet forms a core of the electromagnet.

11. Switch device according to claim 10, wherein the electromagnet is pole-changing.

12. Switch device according to claim 1, wherein the switch element is transversely elastically flexible.

13. Switch device according to claim 12, wherein the switch element comprises a spring tongue having broad sides oriented toward the counter-contact elements.

14. Switch device according to claim 1, wherein the switch elements are disposed in a protective space of a housing.

15. Switch device according to claim 14, wherein an electromagnet is disposed next to or below the protective space.

16. Switch device according to claim 15, wherein the electromagnet is disposed laterally on the housing or in a recess in the base of the housing.

17. Switch device according to claim 6, wherein the housing has a cover and at least one permanent magnet is disposed in a recess of the cover.

* * * * *